(12) United States Patent
Trombetta et al.

(10) Patent No.: US 10,319,049 B2
(45) Date of Patent: Jun. 11, 2019

(54) RE-SHARING MEDIA CONTENT ON A NETWORK

(71) Applicant: SONY INTERACTIVE ENTERTAINMENT LLC, San Mateo, CA (US)

(72) Inventors: Steven Trombetta, San Francisco, CA (US); Shunsuke Kunieda, San Francisco, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 584 days.

(21) Appl. No.: 15/069,475

(22) Filed: Mar. 14, 2016

(65) Prior Publication Data

US 2017/0244774 A1    Aug. 24, 2017

Related U.S. Application Data

(60) Provisional application No. 62/299,381, filed on Feb. 24, 2016.

(51) Int. Cl.
*G06F 3/048* (2013.01)
*G06Q 50/00* (2012.01)
*G06Q 30/02* (2012.01)

(52) U.S. Cl.
CPC ......... *G06Q 50/01* (2013.01); *G06Q 30/0201* (2013.01)

(58) Field of Classification Search
CPC ........................... G06Q 50/01; G06Q 30/0201
See application file for complete search history.

(56) References Cited

U.S. PATENT DOCUMENTS

| 7,864,163 | B2* | 1/2011 | Ording | G06F 3/0488 |
| | | | | 345/173 |
| 7,933,956 | B2* | 4/2011 | Hon | G06F 17/30058 |
| | | | | 709/205 |
| 8,244,848 | B1* | 8/2012 | Narayanan | G06Q 50/01 |
| | | | | 709/218 |

(Continued)

FOREIGN PATENT DOCUMENTS

WO         2014004615         1/2014

OTHER PUBLICATIONS

Google Plus Posts: 10 Things You Should Know; Brian Jensen; Jan. 25, 2015.

*Primary Examiner* — David Phantana-angkool
(74) *Attorney, Agent, or Firm* — Trellis IP Law Group, PC (57) ABSTRACT

Implementations generally relate to the sharing of media content. In some implementations, a method includes providing a grid view in a user interface, where the grid view displays media content items that have been shared in a network. The method also includes providing a gallery view in response to a user selecting a media content item among the media content items in the grid view, where the gallery view displays the selected media content item. The method also includes providing a share menu view in response to the user selecting a re-share button, where the share menu view displays options for sharing the selected media content item. The method also includes providing a comment view, where the comment view enables the user to comment on the selected media content item. The method also includes re-sharing the selected media content item to other users.

20 Claims, 10 Drawing Sheets

(56) References Cited

U.S. PATENT DOCUMENTS

| | | | |
|---|---|---|---|
| 8,707,184 B2* | 4/2014 | Chen | H04W 4/21 |
| | | | 715/738 |
| 8,725,858 B1 | 5/2014 | Wu et al. | |
| 9,275,119 B2* | 3/2016 | Rubinstein | G06F 17/30554 |
| 9,423,922 B2* | 8/2016 | Welinder | H04L 65/403 |
| 9,665,884 B2* | 5/2017 | Shimpa | G06Q 30/0251 |
| 9,747,562 B1* | 8/2017 | Krappe | G06Q 10/06 |
| 2012/0290308 A1* | 11/2012 | Detwiller | G06Q 30/02 |
| | | | 705/1.1 |
| 2013/0151603 A1* | 6/2013 | Lobb | A63F 13/795 |
| | | | 709/204 |
| 2014/0243097 A1 | 8/2014 | Yong et al. | |
| 2015/0180914 A1* | 6/2015 | Welinder | H04L 65/403 |
| | | | 715/758 |
| 2018/0341387 A1* | 11/2018 | Segal | G06F 3/04817 |
| 2018/0349703 A1* | 12/2018 | Rathod | A63F 13/216 |

* cited by examiner

RE-SHARING MEDIA CONTENT ON A NETWORK

CROSS REFERENCE TO RELATED APPLICATIONS

This application claims priority from U.S. Provisional Patent Application No. 62/299,381 entitled, "Re-Share," filed Feb. 24, 2016, which is hereby incorporated by reference as if set forth in full in this application for all purposes.

BACKGROUND

Network systems often enable users to upload media content such as videos, images, broadcasts, etc. Users can share such media content with other users such as friends and family, which increases engagement through user expression. Other users who receive the shared media content can typically comment on shared media content. Such sharing of media content and commenting on media content also provides enjoyable, shared experiences among users of a network system.

SUMMARY

Implementations generally relate to the sharing of media content. In some implementations, a method includes providing a grid view in a user interface, where the grid view displays media content items that have been shared in a network. The method also includes providing a gallery view in response to a user selecting a media content item among the media content items in the grid view, where the gallery view displays the selected media content item. The method also includes providing a share menu view in response to the user selecting a re-share button, where the share menu view displays options for sharing the selected media content item. The method also includes providing a comment view, where the comment view enables the user to comment on the selected media content item. The method also includes re-sharing the selected media content item to other users.

With further regard to the method, in some implementations, the media content items include one or more of at least one video, at least one broadcast, at least one screenshot, at least one trophy, and at least one event. In some implementations, re-share button is displayed in the gallery view. In some implementations, the re-share button is a physical button. In some implementations, the method further includes providing a confirmation view, where the confirmation view confirms to the user that the selected media content item has been successfully re-shared. In some implementations, the method further includes notifying an original poster of a particular media content item that the particular media content has been re-shared. In some implementations, the method further includes providing a re-share list view, where the re-share list view displays a list of one or more users who have re-shared a particular media content item.

In some implementations, software is encoded in one or more non-transitory computer-readable media for execution by the one or more processors. When executed, the software is operable to perform operations including providing a grid view in a user interface, where the grid view displays media content items that have been shared in a network. The software when executed is further operable to perform operations including providing a gallery view in response to a user selecting a media content item among the media content items in the grid view, where the gallery view displays the selected media content item. The software when executed is further operable to perform operations including providing a share menu view in response to the user selecting a re-share button, where the share menu view displays options for sharing the selected media content item. The software when executed is further operable to perform operations including providing a comment view, where the comment view enables the user to comment on the selected media content item. The software when executed is further operable to perform operations including re-sharing the selected media content item to other users.

With further regard to the software, in some implementations, the media content items include one or more of at least one video, at least one broadcast, at least one screenshot, at least one trophy, and at least one event. In some implementations, the re-share button is displayed in the gallery view. In some implementations, the re-share button is a physical button. In some implementations, the software when executed is further operable to perform operations including providing a confirmation view, where the confirmation view confirms to the user that the selected media content item has been successfully re-shared. In some implementations, the software when executed is further operable to perform operations including notifying an original poster of a particular media content item that the particular media content has been re-shared. In some implementations, the software when executed is further operable to perform operations including providing a re-share list view, where the re-share list view displays a list of one or more users who have re-shared a particular media content item.

In some implementations, a system includes one or more processors, and includes logic encoded in one or more tangible media for execution by the one or more processors. When executed, the logic is operable to perform operations including providing a grid view in a user interface, where the grid view displays media content items that have been shared in a network. The logic when executed is further operable to perform operations including providing a gallery view in response to a user selecting a media content item among the media content items in the grid view, where the gallery view displays the selected media content item. The logic when executed is further operable to perform operations including providing a share menu view in response to the user selecting a re-share button, where the share menu view displays options for sharing the selected media content item. The logic when executed is further operable to perform operations including providing a comment view, where the comment view enables the user to comment on the selected media content item. The logic when executed is further operable to perform operations including re-sharing the selected media content item to other users.

With further regard to the system, in some implementations, the media content items include one or more of at least one video, at least one broadcast, at least one screenshot, at least one trophy, and at least one event. In some implementations, the re-share button is displayed in the gallery view. In some implementations, the re-share button is a physical button. In some implementations, the logic when executed is further operable to perform operations including providing a confirmation view, where the confirmation view confirms to the user that the selected media content item has been successfully re-shared. In some implementations, the logic when executed is further operable to perform operations including notifying an original poster of a particular media content item that the particular media content has been re-shared.

DETAILED DESCRIPTION

Implementations generally relate to the sharing of media content, and, in particular, the re-sharing of media content. In various implementations, a system provides various user interface views that enable a user to select a particular media content item (e.g., video, broadcast, screenshot, trophy, activity, etc.) that has been shared by another user in a network. The system enables the user to re-share the selected media content item to other users. Various implementations of the user interface views and other features are described in more detail herein.

Figure 1:
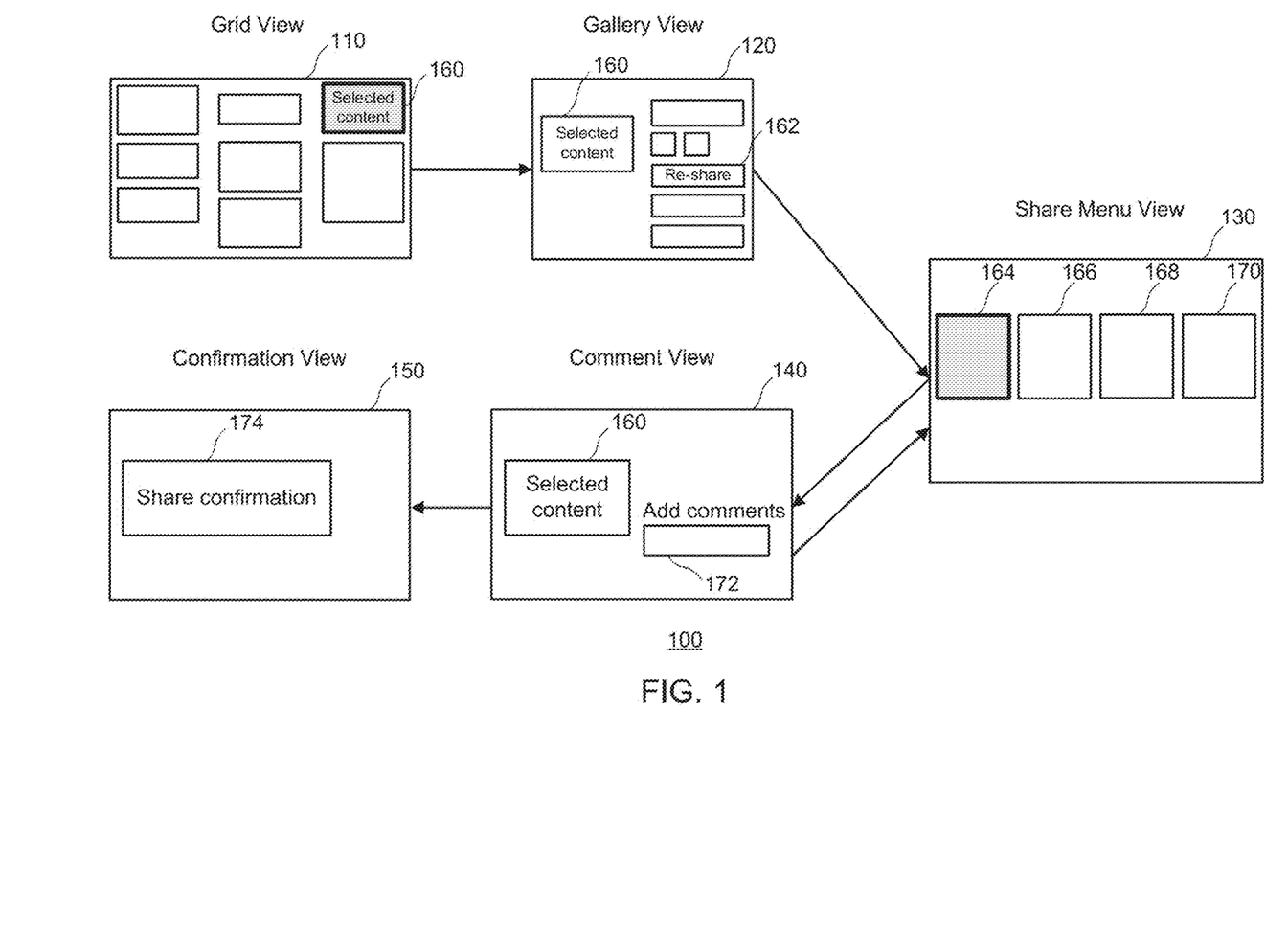
FIG. 1 illustrates a block diagram of example user interface views for re-sharing media content, according to some implementations.

FIG. 1 illustrates a block diagram of example user interface views 100 for re-sharing media content, according to some implementations. As shown, a system provides a grid view 110, a gallery view 120, a share menu view 130, a comment view 140, and a confirmation view 150. As described in more detail herein, these views take a user through a process for re-sharing media content.

Figure 2:
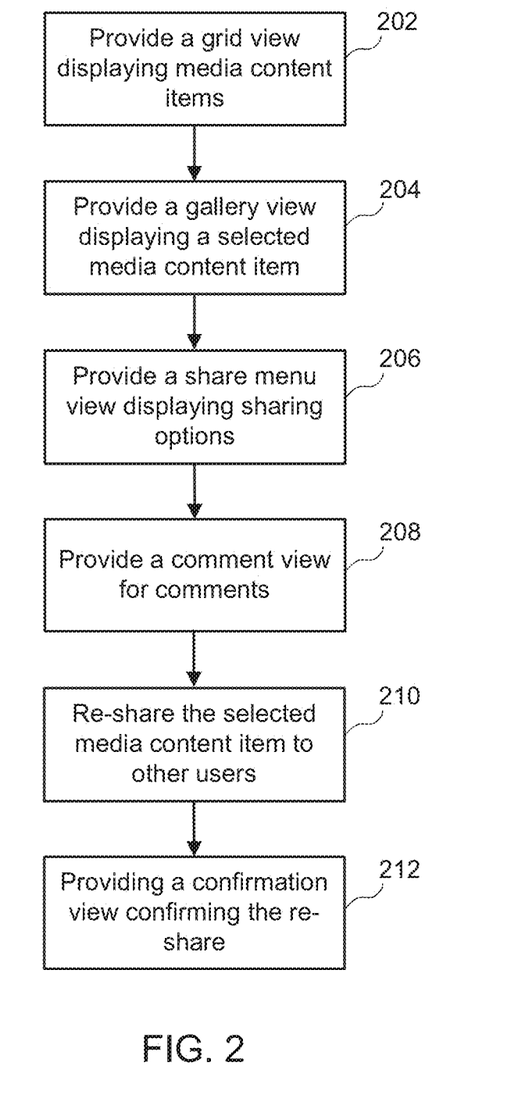
FIG. 2 illustrates an example flow diagram for re-sharing media content, according to some implementations.

FIG. 2 illustrates an example flow diagram for re-sharing media content, according to some implementations. Referring to both FIGS. 1 and 2, a method is initiated at block 202, where a system provides grid view 110 in a user interface, where grid view 110 displays media content items that have been shared in a network. In various implementations, grid view 110 enables a user to select one of the media content items for re-sharing. In this example, a media content item 160 is selected. In various implementations, media content item 160 a video, broadcast, screenshot, trophy, activity, etc. Example implementations of grid view 110 are described in more detail below.

At block 204, the system provides gallery view 120 in response to the user selecting a media content item among the media content items in the grid view, where gallery view 120 displays the selected media content item. As shown, media content item 160 is displayed. In various implementations, gallery view 120 also displays a re-share button 162, which enables the user to re-share the media content item shown in gallery view 120. Example implementations of gallery view 120 are described in more detail below.

At block 206, the system provides share menu view 130 in response to the user selecting a re-share button, where share menu view 130 displays options for sharing the selected media content item. As shown, share menu view 130 includes various options 164, 166, 168, and 170. Such options may include, for example, uploading a video, uploading a screenshot, etc. In this particular example, option 164 is selected, where option 164 uploads a video. Example implementations of share menu view 130 are described in more detail below.

At block 208, the system provides comment view 140, where comment view 140 enables the user to comment on the selected media content item. As shown, comment view 140 displays selected media content item 160. Comment view 140 also displays a comment field 172 in which the user may type in a comment about media content item 160.

At block 210, the system re-shares the selected media content item to other users. For example, after the user enters a comment, the user may select a send button or an okay button (not shown) after which the system sends or re-shares the selected media content item to other users. Example implementations of comment view 140 are described in more detail below.

At block 212, the system provides confirmation view 150, where confirmation view 150 confirms to the user that the selected media content item has been successfully re-shared. For example, confirmation view 150 may display a share confirmation indication 174, which confirms to the user that the media content item has been successfully re-shared.

Various example implementations of grid view 110, gallery view 120, share menu view 130, comment view 140, and confirmation view 150 are described in more detail below. In various implementations, grid view 110, gallery view 120, share menu view 130, comment view 140, and confirmation view 150 may not have all of the components shown and/or may have other elements including other types of components instead of, or in addition to, those shown herein.

Figure 3:
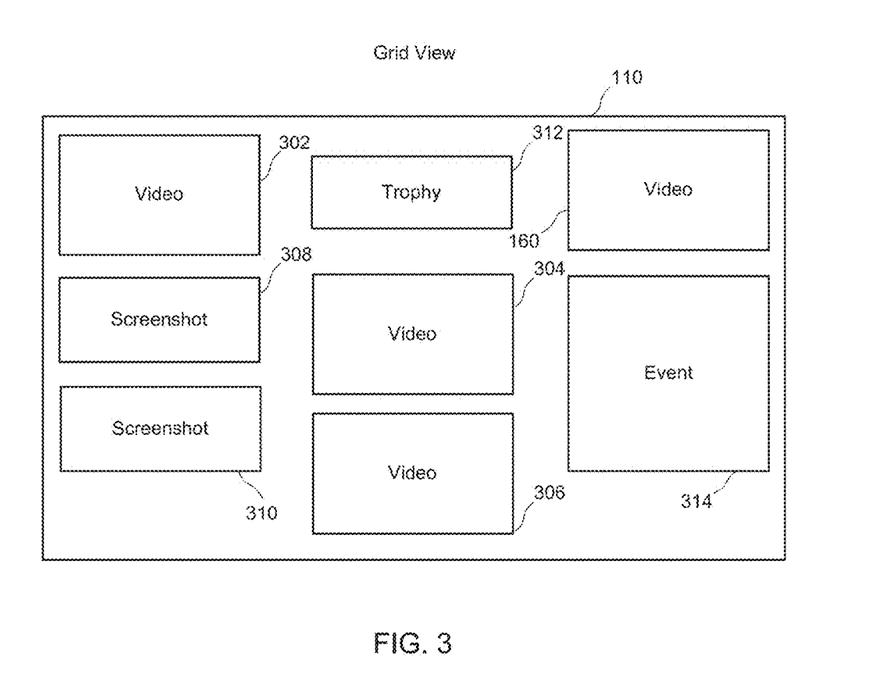
FIG. 3 illustrates an example grid view, according to some implementations.

FIG. 3 illustrates grid view 110, according to some implementations. In various implementations, grid view 110 displays activity feed stories, which may include various types of media content items, which may include one or more videos, one or more broadcasts, one or more screenshots, one or more trophies (or trophy stories), one or more events, etc. As shown this particular example, grid view 110 displays videos 160, 302, 304, and 306. Grid view 110 also displays screenshots 308 and 310. Grid view 110 also displays a trophy 312 and an event 314. In various implementations, media content items may also be referred to as content stories. In some implementations, broadcasts are saved and thus may be re-shared.

In some implementations, the re-sharing of trophies may include auto-trophy share, manual trophy share with a trophy screenshot, and manual trophy share without a trophy screenshot. In various implementations, events may include indications that a user has registered to an event or has manually shared an event.

In some implementations, the system enables a user to re-share non-content activity feed stories. In some implementations, the system enables a user to re-share other media content items such as photos, store promotions, publisher promotions, etc.

In some implementations, re-shared media items may include text, web pages (URLs), game play data, etc. In some implementations, game play data may include game statistic such as game scores, all-time high game scores, etc., for example. The particular game play data may vary and will depend on the particular implementation.

In some implementations, the system enables a user to re-share condensed stories. For example, the system may enable a user to select multiple screenshots, where the system groups or condenses the selected screenshots into one condensed story. In some implementations, the condensed story may be presented as a slide show. The condensed story may then be re-shared. Users may associate comments to the entire condensed story.

Figure 4:
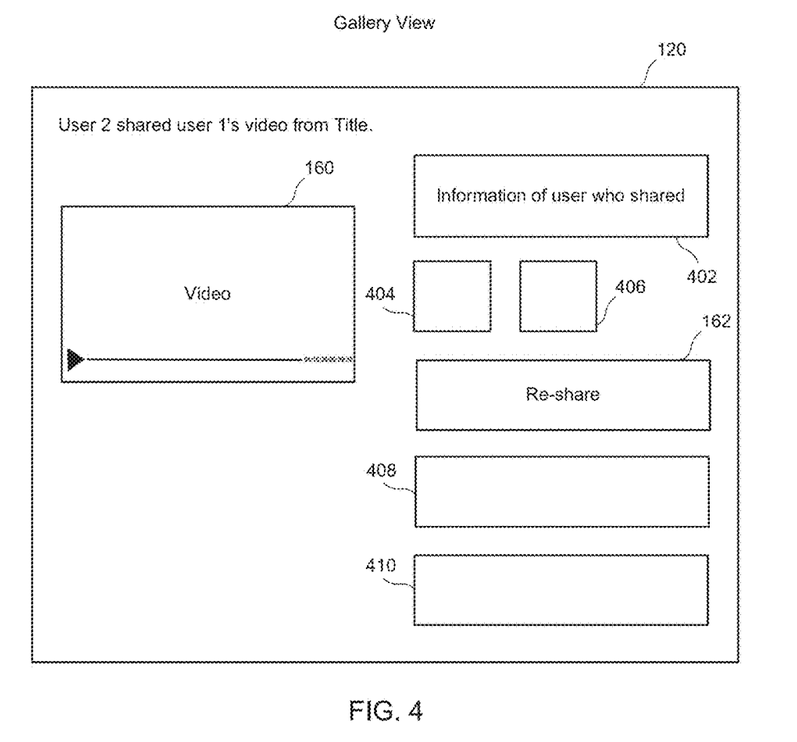
FIG. 4 illustrates an example gallery view, according to some implementations.

FIG. 4 illustrates gallery view 120, according to some implementations. As indicated above, gallery view 120 displays selected media content item 160. In this particular example, media content item 160 is a video. Above media content item 160 is an indication of who (e.g., "User 2") previously re-shared media content item 160, who (e.g., "User 1") was the original poster of media content item 160, and the title (e.g., "Title") of media content item 160.

In some implementations, the system re-shares the original media content item. As such, the content area displaying media content item 160 appears and functions the same as the original post.

In some implementations, gallery view 120 displays a button 402 that upon selection enables the user to view information of the user who shared media content item 160 (e.g., the user who most recently re-shared media content item 160, the original poster of media content item 160, etc.).

Gallery view 120 may also display other buttons 404 and 406, which may provide different functions (e.g., "like" selection, re-share count, etc.). Gallery view 120 also displays other buttons 408 and 410, which may provide different functions (e.g., display information about the media content item, display activity information about the original poster of the media content item, etc.). Other functions are possible and will depend on the particular implementation.

In various implementations, re-share button 162 is displayed in gallery view 120, where re-share button 162 enables the user to re-share the selected media content item.

In some implementations, the system enables re-share privacy settings, which enable the original poster to determine which users can re-share a particular media content item. For example, the original poster may allow no one to view particular media content items, or friends and/or friends of friends to view particular media content items. The original poster may allow anyone to view particular media content items.

In various implementations, the re-share privacy settings are associated with the particular media content item and follow the media content item such that the re-share privacy settings always apply (e.g., to future re-shares) until the original poster changes the re-share privacy settings.

In some implementations, the system may enable first-party content privacy filtering. As such, users who have access to the original story can see the re-shared story, and users who do not have access to the original story cannot see the re-shared story. In some implementations, the system may enable third-party content privacy filtering. As such, a given media content item may be hidden in a feed such that it cannot be viewed. In some implementations, all re-shared feed items are filtered as if they were posted by the original poster of the feed item regardless of where they are distributed. Also, the system may respect third-party privacy settings. In some implementations, re-shared feed items may be distributed into a "What's New" section as if they are shared stories from a secondary poster. For verified accounts, this means they will be distributed to all followers.

In some implementations, the system may gray out re-share button 162 if the user cannot re-share the selected media content item. In some implementations, the system may display an error screen that indicates an inability to re-share the selected media content item. In some implementations, the error screen may indicate a reason why the user cannot re-share the selected media content item.

In some implementations, a re-share button may be a physical re-share button. For example, in some implementations, the re-share button may be a physical re-share button on a hand-held device that is associated with the system. In some implementations, such a physical re-share button may be linked to the re-share button in gallery view 120. In some implementations, the system may enable the user to press the physical re-share button (not shown) on a hand-held device while the user is at grid view 110 in order to re-share a media content item.

In some implementations, when a user presses the physical re-share button, the system enables a disambiguation screen that enables the user to select which media content item to re-share. In some implementations, the physical re-share button may be used to re-share a condensed story.

Figure 5:
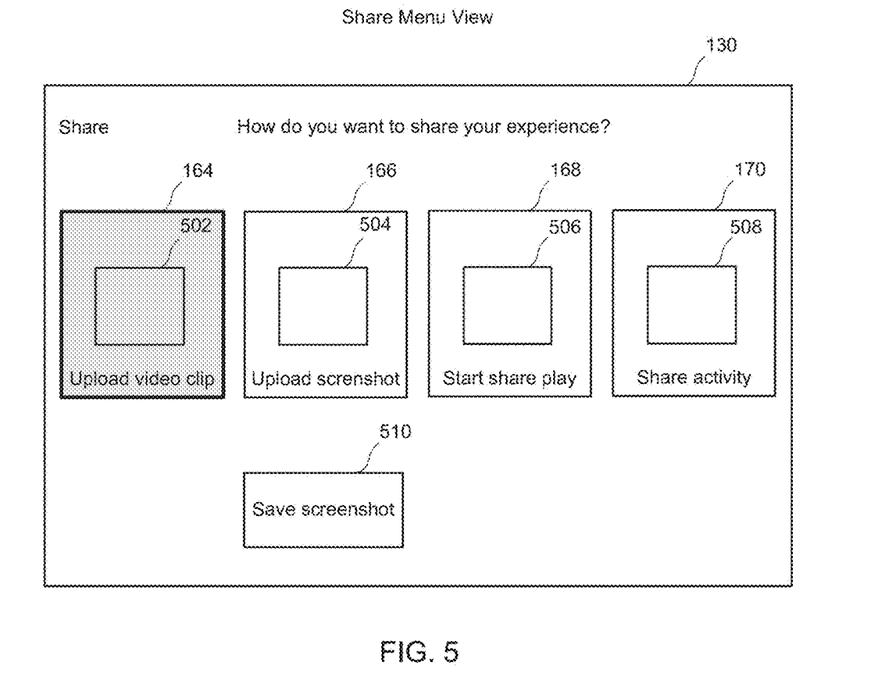
FIG. 5 illustrates an example share menu view, according to some implementations.

FIG. 5 illustrates share menu view 130, according to some implementations. As indicated above, share menu view 130 includes various options 164, 166, 168, and 170 for sharing a given media content item, where the user may select any one of options 164, 166, 168, and 170. For example, option 164 enables the user to upload a video. Option 164 may include a thumbnail 502 of a video. In some implementations, thumbnail 502 may be a thumbnail of the media content item shown in gallery view 120.

In some implementations, option 166 enables the user to upload a screenshot. Option 166 may include a thumbnail 504 of a screenshot. In some implementations, thumbnail 504 may be a thumbnail of the media content item shown in gallery view 120.

In some implementations, option 168 enables the user to start a share play. Option 168 may include an icon 506 that represents generic share play activity. In some implementations, thumbnail 506 may be a thumbnail associated with a particular video game.

In some implementations, option 170 enables the user to share an activity. Option 170 may include a thumbnail 508 that represents a generic activity. In some implementations, thumbnail 508 may be a thumbnail representing a particular activity.

In some implementations, share menu view 130 also displays save screenshot button 510, which enables the user to save a screenshot.

In this particular example, option 164 is selected, where option 164 uploads a video. The upload video is the media content item to be re-shared.

Figure 6:
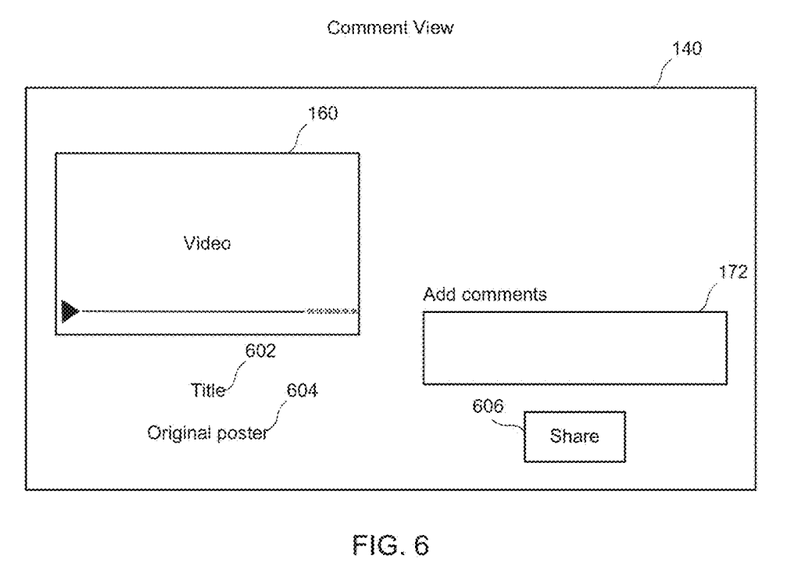
FIG. 6 illustrates an example comment view, according to some implementations.

FIG. 6 illustrates comment view 140, according to some implementations. As shown, comment view 140 displays selected media content item 160, which is a video. Comment view 140 also displays comment field 172 in which the user may type in a comment about content media item 160.

In some implementations, comment view 140 also displays a title 602 (shown as "Title") of content media item 160. Comment view 140 also displays information about the original poster 604 (shown as "Original poster"), which could be the name or other information associated with the original poster.

As shown, comment view 140 may also display a share button 606. Upon selection of share button 606, the system re-shares media content item 160. In some implementations, the system may re-share a media content item within the network and/or outside the network (e.g., to external networks).

In some implementations, the system enables a user to toggle back-and-forth between share menu view 130 and comment view 140.

In various implementations, each re-share gains its own new set of comments and likes. In some implementations, if a user views the original media content, the user will see the set of comments, tags, and likes for that original post.

In some implementations, the system notifies the user who created the original content (e.g., original poster) of a particular media content item that the particular media content has been re-shared.

Figure 7:
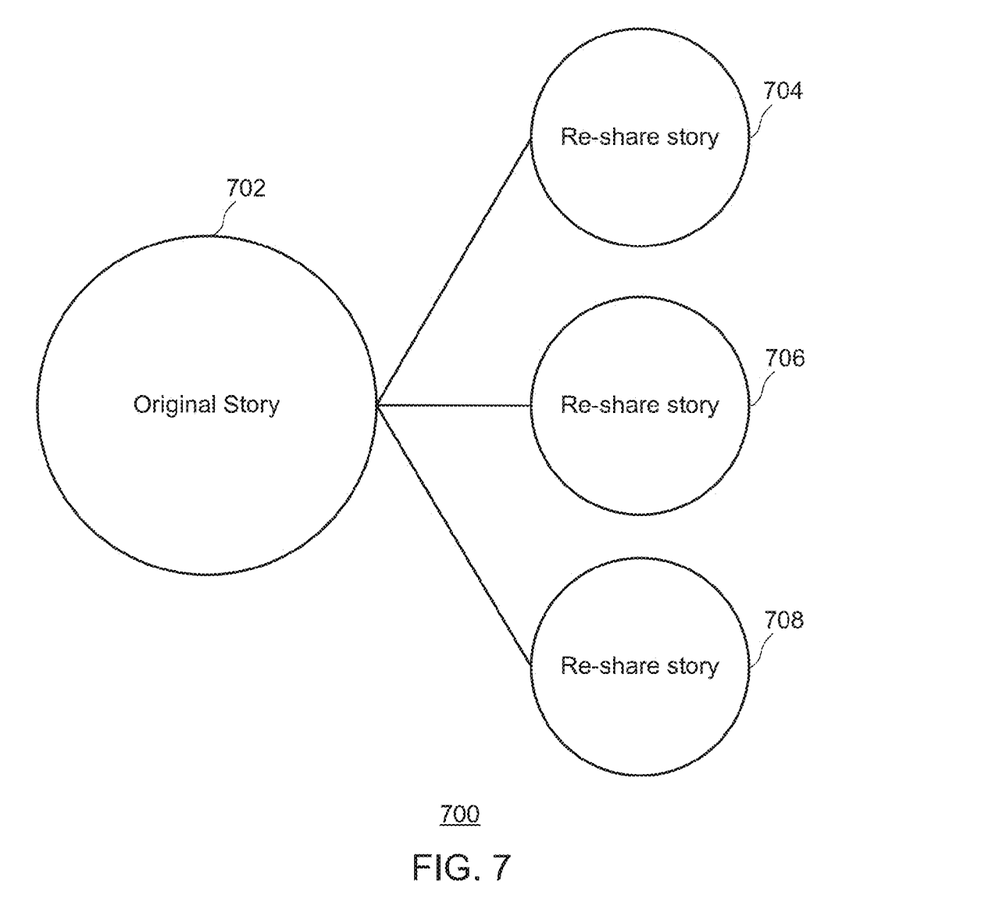
FIG. 7 illustrates an example media content hierarchy, according to some implementations.

FIG. 7 illustrates an example media content hierarchy 700, according to some implementations. Shown is an original media content item 702 (labeled "Original Story"), and instances the media content item re-shared 704, 706, and 708 (labeled "Re-share story"). As shown, each media content item that is re-shared 704, 706, and 708 is a child of an original media content item 702. In various implementations, the system re-shares the original media content item, not the re-shared copy of the original activity. As such, when a user views a re-share of a media content item, the user is viewing the original media content item. Also, the user will view comments from the original poster and comments from the seconder poster who is re-sharing. The user will not view comments from other users who have re-shared the media content item.

Figure 8:
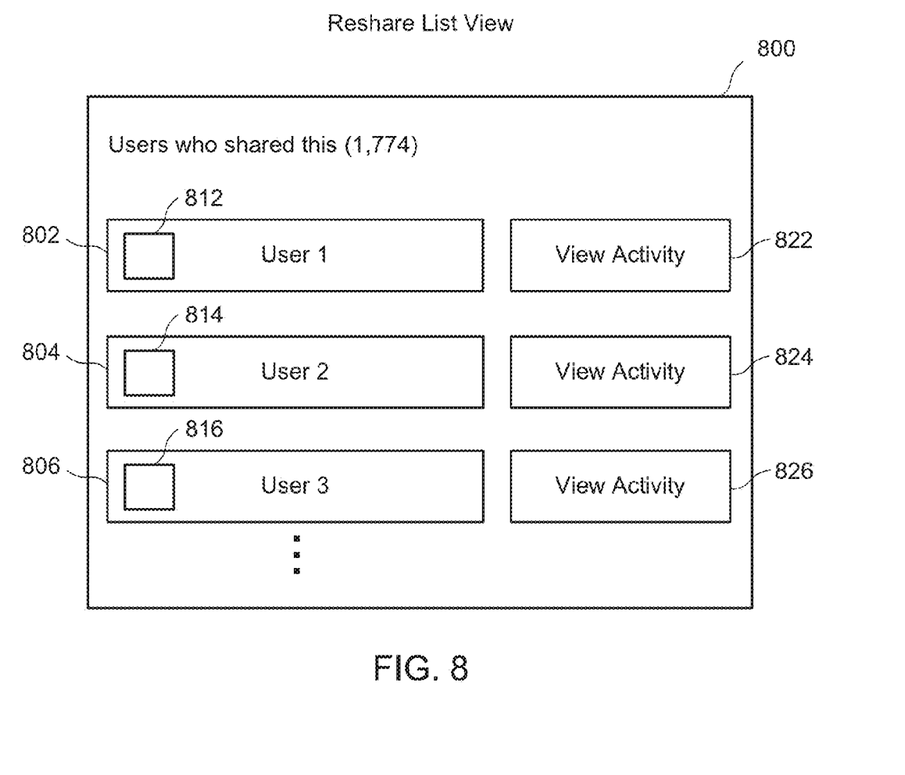
FIG. 8 illustrates an example re-share list view, according to some implementations.

FIG. 8 illustrates an example re-share list view 800, according to some implementations. In some implementations, the system provides re-share list view 800, which displays a list of one or more users who have re-shared a particular media content item. In some implementations, the list of users is displayed to the original poster of the media content item. In some implementations, the list of users may be displayed to any user who views the shared media content item.

As shown, re-share list view 800 may display a count (e.g., 1774, etc.) of the number of users that have shared the media content item. In some implementations, the count is the total number of shares. In some implementations, the count is the total number of re-shares. Note that a re-share is the same as a share, but the original posting would not be a re-share as it would be the first share. As such, the total number of re-shares would not include the original posting.

In various implementations, re-share list view 800 displays information 802, 804, 806, etc., associated with the users who have re-shared the particular media content item. In some implementations, the list may be sorted by time, with the most recent re-share on top. In some implementations, re-share list view 800 may display avatars 812, 814, 816, etc. associated with the respective users. In some implementations, re-share list view 800 may display view activity buttons 822, 824, 826, etc. associated with the respective users. View activity buttons 822, 824, 826, etc. enable the user to view activity associated with the respective users.

In some implementations, when the original activity is deleted, the system deletes all re-shares. This includes deleting ended broadcasts and associated re-shares.

In some implementations, the system enables grief reporting, where the user can grief report re-shares.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 9:
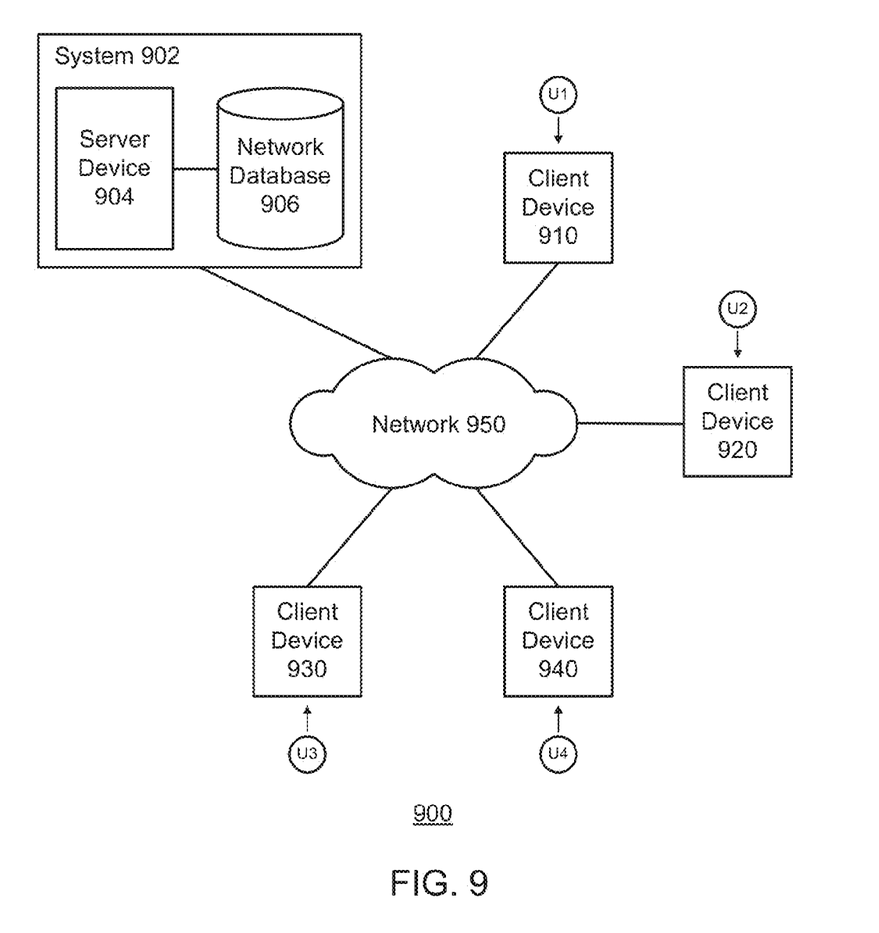
FIG. 9 illustrates a block diagram of an example environment, which may be used for some implementations described herein.

Implementations described herein provide various benefits. For example, implementations enable users to organically create socially viral experiences on a network. Implementations described herein also increase engagement through user expression of intent. Implementations described herein also increase quality media content items in a feed through user action FIG. 9 illustrates a block diagram of an example network environment 900, which may be used for some implementations described herein. In some implementations, network environment 900 includes a system 902, which includes a server device 904 and a network database 906. Network environment 900 also includes client devices 910, 920, 930, and 940, which may communicate with each other directly or via system 902. Network environment 900 also includes a network 950.

For ease of illustration, FIG. 9 shows one block for each of system 902, server device 904, and network database 906, and shows four blocks for client devices 910, 920, 930, and 940. Blocks 902, 904, and 906 may represent multiple systems, server devices, and network databases. Also, there may be any number of client devices. In other implementations, network environment 900 may not have all of the components shown and/or may have other elements including other types of elements instead of, or in addition to, those shown herein. In various implementations, users U1, U2, U3, and U4 may interact with each other or with system 902 using respective client devices 910, 920, 930, and 940.

In the various implementations described herein, a processor of system 902 and/or a processor of any client device 910, 920, 930, and 940 causes the elements described herein (e.g., information, etc.) to be displayed in a user interface on one or more display screens.

Implementations may apply to any network system and/or may apply locally for an individual user. For example, implementations described herein may be implemented by system 902 and/or any client device 910, 920, 930, and 940. System 902 may perform the implementations described herein on a stand-alone computer, tablet computer, smartphone, etc. System 902 and/or any of client devices 910, 920, 930, and 940 may perform implementations described herein individually or in combination with other devices.

Figure 10:
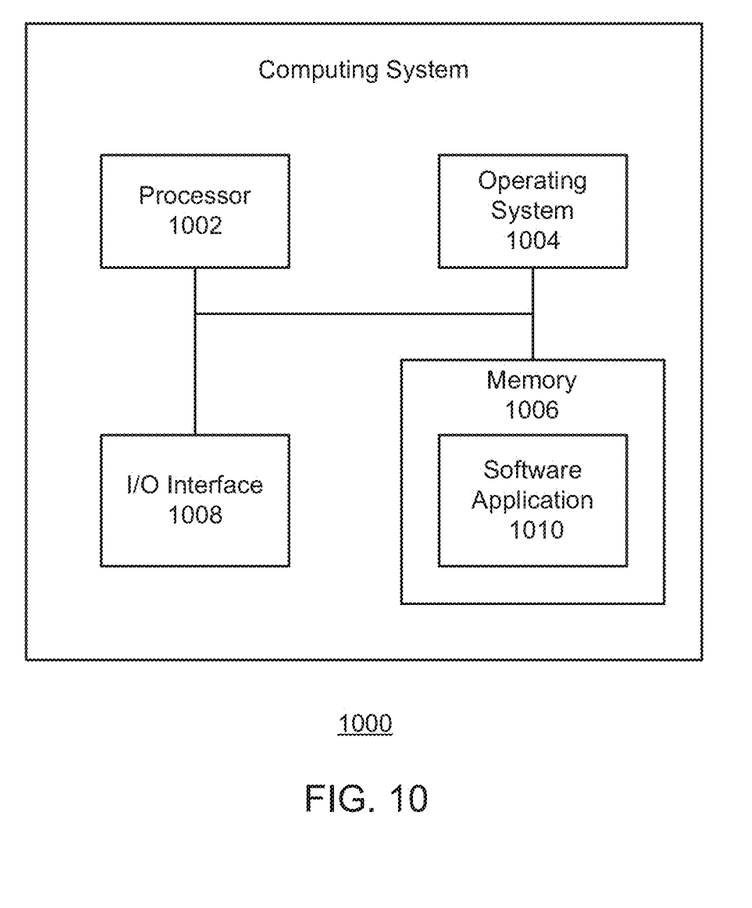
FIG. 10 illustrates a block diagram of an example computing system, which may be used for some implementations described herein.

FIG. 4 illustrates a block diagram of an example computing system 1000, which may be used for some implementations described herein. For example, computing system 1000 may be used to implement server device 904 of FIG. 9, as well as to perform the method implementations described herein. In some implementations, computing system 1000 may include a processor 1002, an operating system 1004, a memory 1006, and an input/output (I/O) interface 1008. In various implementations, processor 1002 may be used to implement various functions and features described herein, as well as to perform the method implementations described herein. While processor 1002 is described as performing implementations described herein, any suitable component or combination of components of computing system 1000 or any suitable processor or processors associated with computing system 1000 or any suitable system may perform the steps described. Implementations described herein may be carried out on a user device, on a server, or a combination of both.

Computing system 1000 also includes a software application 1010, which may be stored on memory 1006 or on any other suitable storage location or computer-readable medium. Software application 1010 provides instructions that enable processor 1002 to perform the implementations described herein and other functions. Software application may also include an engine such as a network engine for performing various functions associated with one or more networks and network communications. The components of computing system 1000 may be implemented by one or more processors or any combination of hardware devices, as well as any combination of hardware, software, firmware, etc.

For ease of illustration, FIG. 10 shows one block for each of processor 1002, operating system 1004, memory 1006, I/O interface 1008, and software application 1010. These blocks 1002, 1004, 1006, 1008, and 1010 may represent multiple processors, operating systems, memories, I/O interfaces, and software applications. In various implementations, computing system 1000 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software encoded is in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, system, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmed general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A computer-implemented method comprising:
providing a first view in a user interface, wherein the first view displays media content items that have been shared in a network, wherein the media content items comprise first-time shares and re-shares, wherein a first-time share is an original share of a media content item, wherein a re-share is a subsequent share of a media content item, and wherein the network provides a network environment through which users share media content items;
providing a gallery view in response to a user selecting a media content item among the media content items in the first view, wherein the gallery view displays the selected media content item;
providing a share menu view in response to the user selecting a re-share button, wherein the share menu view displays options for re-sharing the selected media content item;
providing a comment view, wherein the comment view enables the user to comment on the selected media content item;
providing re-share privacy settings that enable an original poster of a particular media content item to determine which users can re-share the particular media content item and which users can view the particular media content item; and
re-sharing the selected media content item to other users.

2. The method of claim 1, wherein the media content items comprise one or more of at least one video, at least one broadcast, at least one screenshot, at least one trophy, and at least one event.

3. The method of claim 1, wherein the media content items comprise game play data, and wherein the game play data comprises game statistics and game scores.

4. The method of claim 1, wherein the re-share button is a physical button.

5. The method of claim 1, further comprising providing a confirmation view, wherein the confirmation view confirms to the user that the selected media content item has been successfully re-shared.

6. The method of claim 1, further comprising notifying an original poster of a particular media content item that the particular media content item has been re-shared.

7. The method of claim 1, further comprising providing a re-share list view, wherein the re-share list view displays a list of one or more users who have re-shared a particular media content item.

8. Software encoded in one or more non-transitory computer-readable media for execution by one or more processors and when executed operable to perform operations comprising:
provide a first view in a user interface, wherein the first view displays media content items that have been shared in a network, wherein the media content items comprise first-time shares and re-shares, wherein a first-time share is an original share of a media content item, wherein a re-share is a subsequent share of a media content item, and wherein the network provides a network environment through which users share media content items;
providing a gallery view in response to a user selecting a media content item among the media content items in the first view, wherein the gallery view displays the selected media content item;
providing a share menu view in response to the user selecting a re-share button, wherein the share menu view displays options for re-sharing the selected media content item;
providing a comment view, wherein the comment view enables the user to comment on the selected media content item;
providing re-share privacy settings that enable an original poster of a particular media content item to determine which users can re-share the particular media content item and which users can view the particular media content item; and
re-sharing the selected media content item to other users.

9. The software of claim 8, wherein the media content items comprise one or more of at least one video, at least one broadcast, at least one screenshot, at least one trophy, and at least one event.

10. The software of claim 8, wherein the re-share button is displayed in the gallery view.

11. The software of claim 8, wherein the re-share button is a physical button.

12. The software of claim 8, wherein the software when executed is further operable to perform operations comprising providing a confirmation view, wherein the confirmation view confirms to the user that the selected media content item has been successfully re-shared.

13. The software of claim 8, wherein the software when executed is further operable to perform operations comprising notifying an original poster of a particular media content item that the particular media content item has been re-shared.

14. The software of claim 8, wherein the software when executed is further operable to perform operations comprising providing a re-share list view, wherein the re-share list view displays a list of one or more users who have re-shared a particular media content item.

15. A system comprising:
one or more processors; and
logic encoded in one or more non-transitory computer-readable media for execution by the one or more processors and when executed operable to perform operations comprising:
providing a first view in a user interface, wherein the first view displays media content items that have been shared in a network, wherein the media content items comprise first-time shares and re-shares, wherein a first-time share is an original share of a media content item, wherein a re-share is a subsequent share of a media content item, and wherein the network provides a network environment through which users share media content items;
providing a gallery view in response to a user selecting a media content item among the media content items in the first view, wherein the gallery view displays the selected media content item;
providing a share menu view in response to the user selecting a re-share button, wherein the share menu view displays options for re-sharing the selected media content item;
providing a comment view, wherein the comment view enables the user to comment on the selected media content item;
providing re-share privacy settings that enable an original poster of a particular media content item to determine which users can re-share the particular media content item and which users can view the particular media content item; and
re-sharing the selected media content item to other users.

16. The system of claim 15, wherein the media content items comprise one or more of at least one video, at least one broadcast, at least one screenshot, at least one trophy, and at least one event.

17. The system of claim 15, wherein the re-share button is displayed in the gallery view.

18. The system of claim 15, wherein the re-share button is a physical button.

19. The system of claim 15, wherein the logic when executed is further operable to perform operations comprising providing a confirmation view, wherein the confirmation view confirms to the user that the selected media content item has been successfully re-shared.

20. The system of claim 15, wherein the logic when executed is further operable to perform operations comprising notifying an original poster of a particular media content item that the particular media content item has been re-shared.

* * * * *